United States Patent
Chen et al.

(10) Patent No.: US 10,866,969 B2
(45) Date of Patent: Dec. 15, 2020

(54) STORAGE SYSTEM WITH LOOPBACK REPLICATION PROCESS PROVIDING UNIQUE IDENTIFIERS FOR COLLISION-FREE OBJECT PAIRING

(71) Applicant: EMC IP Holding Company LLC, Hopkinton, MA (US)

(72) Inventors: Xiangping Chen, Sherborn, MA (US); Bar David, Rishon Lezion (IL); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 360 days.

(21) Appl. No.: 15/938,058

(22) Filed: Mar. 28, 2018

(65) Prior Publication Data
US 2019/0303491 A1 Oct. 3, 2019

(51) Int. Cl.
*G06F 16/30* (2019.01)
*G06F 16/27* (2019.01)

(52) U.S. Cl.
CPC .......... *G06F 16/275* (2019.01); *G06F 16/273* (2019.01)

(58) Field of Classification Search
CPC .... G06F 11/2094; G06F 16/275; G06F 11/26; G06F 11/2097; G06F 16/273; G06F 17/30
(Continued)

(56) References Cited

U.S. PATENT DOCUMENTS

| 4,860,191 A | 8/1989 | Nomura et al. |
| 5,060,188 A | 10/1991 | Zulian et al. |

(Continued)

FOREIGN PATENT DOCUMENTS

| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Hicham Skhoun
(74) *Attorney, Agent, or Firm* — Ryan, Mason & Lewis, LLP

(57) ABSTRACT

A storage system in one embodiment comprises a plurality of storage devices and a storage controller. The storage system implements a loopback replication process in which one or more source storage objects are replicated to one or more corresponding target storage objects within the storage system. The storage system obtains a pairing identifier, pairs a source storage object with a target storage object by associating respective distinct instances of the pairing identifier with the source storage object and the target storage object, and replicates the source storage object to the target storage object based at least in part on the associated instances of the pairing identifier. Each of the source and target instances of the pairing identifier comprises a collision field. The collision fields of the source and target instances of the pairing identifier have respective distinct values in order to prevent collisions between the source and target storage objects during loopback replication.

20 Claims, 6 Drawing Sheets

(58) Field of Classification Search
USPC .......................................................... 707/611
See application file for complete search history.

(56) References Cited

U.S. PATENT DOCUMENTS

| | | | |
|---|---|---|---|
| 5,403,639 | A | 4/1995 | Belsan et al. |
| 7,165,155 | B1 | 1/2007 | Duprey et al. |
| 7,440,982 | B2 | 10/2008 | Lu et al. |
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,110,964 | B1 * | 8/2015 | Shilane ................. G06F 16/178 |
| 9,208,162 | B1 | 12/2015 | Hallak et al. |
| 9,286,003 | B1 * | 3/2016 | Hallak .................. G06F 3/0608 |
| 9,459,809 | B1 * | 10/2016 | Chen .................... G06F 3/0649 |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,830,333 | B1 * | 11/2017 | Wisniewski .......... G06F 16/273 |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 10,635,533 | B2 | 4/2020 | Schneider et al. |
| 10,684,915 | B2 | 6/2020 | Schneider et al. |
| 10,691,355 | B2 | 6/2020 | Kucherov et al. |
| 10,691,373 | B2 | 6/2020 | Harduf et al. |
| 10,691,551 | B2 | 6/2020 | Meiri et al. |
| 10,698,772 | B2 | 6/2020 | Hu et al. |
| 10,705,965 | B2 | 7/2020 | Shveidel et al. |
| 10,719,253 | B2 | 7/2020 | Alkalay et al. |
| 10,725,855 | B2 | 7/2020 | Shani et al. |
| 2004/0225697 | A1 * | 11/2004 | Asano ................. G06F 11/2071 |
| 2006/0047713 | A1 * | 3/2006 | Gornshtein ............ G06F 16/27 |
| 2006/0168154 | A1 * | 7/2006 | Zhang ................. G06F 11/1662 |
| | | | 709/220 |
| 2007/0022121 | A1 | 1/2007 | Bahar et al. |
| 2008/0279462 | A1 | 11/2008 | Celi, Jr. |
| 2009/0030983 | A1 * | 1/2009 | Malaiyandi ......... G06F 11/1456 |
| | | | 709/204 |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 * | 1/2011 | Beaverson ............ G06F 16/188 |
| | | | 707/639 |
| 2011/0138144 | A1 * | 6/2011 | Tamura ................. G06F 3/0608 |
| | | | 711/166 |
| 2011/0225123 | A1 * | 9/2011 | D'Souza ............. H04L 67/1002 |
| | | | 707/634 |
| 2012/0124282 | A1 | 5/2012 | Frank et al. |
| 2012/0179653 | A1 * | 7/2012 | Araki .................. H04L 67/1095 |
| | | | 707/634 |
| 2012/0294154 | A1 * | 11/2012 | Missett .................. H04L 43/10 |
| | | | 370/241.1 |
| 2013/0305002 | A1 | 11/2013 | Hallak et al. |
| 2013/0325824 | A1 | 12/2013 | Shoens |
| 2014/0006354 | A1 | 1/2014 | Parkison et al. |
| 2014/0181016 | A1 | 6/2014 | Whitehead et al. |
| 2014/0233366 | A1 * | 8/2014 | Prahlad ................. G06F 3/061 |
| | | | 369/85 |
| 2014/0244935 | A1 | 8/2014 | Ezra et al. |
| 2014/0310441 | A1 * | 10/2014 | Klughart ............... G06F 3/0608 |
| | | | 710/301 |
| 2015/0092539 | A1 * | 4/2015 | Sivabalan ............. H04L 12/437 |
| | | | 370/225 |
| 2015/0220280 | A1 | 8/2015 | Ishizaki |
| 2015/0293817 | A1 * | 10/2015 | Subramanian ...... G06F 11/1448 |
| | | | 707/645 |
| 2015/0317222 | A1 * | 11/2015 | Mahindru ........... G06F 11/2028 |
| | | | 714/4.11 |
| 2015/0378766 | A1 * | 12/2015 | Beveridge ............. G06F 16/273 |
| | | | 718/1 |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0283328 | A1 | 9/2016 | Akirav et al. |
| 2016/0345207 | A1 | 11/2016 | Kwak et al. |
| 2017/0017433 | A1 * | 1/2017 | Ishikawa ................... G06F 3/06 |
| 2017/0075842 | A1 * | 3/2017 | Su ....................... G06F 13/4027 |
| 2017/0090806 | A1 | 3/2017 | Xiong et al. |
| 2017/0147213 | A1 | 5/2017 | Amidi et al. |
| 2017/0185529 | A1 * | 6/2017 | Chhabra ............... G06F 12/145 |
| 2017/0192857 | A1 | 7/2017 | Meiri et al. |
| 2018/0070283 | A1 | 3/2018 | Zhang |
| 2018/0095873 | A1 | 4/2018 | Nakagoe et al. |
| 2019/0095112 | A1 * | 3/2019 | Lingarajappa ........ G06F 3/0656 |
| 2019/0149449 | A1 * | 5/2019 | Morris .................... H04L 45/16 |
| | | | 709/238 |
| 2019/0303009 | A1 | 10/2019 | Meiri et al. |
| 2019/0303490 | A1 | 10/2019 | Chen et al. |
| 2019/0370354 | A1 | 12/2019 | Kucherov et al. |
| 2019/0370355 | A1 | 12/2019 | Kucherov et al. |
| 2019/0370356 | A1 | 12/2019 | Kucherov et al. |
| 2019/0370357 | A1 | 12/2019 | Kucherov et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2020/0218601 | A1 | 7/2020 | Schneider et al. |
| 2020/0218610 | A1 | 7/2020 | Schneider et al. |
| 2020/0225849 | A1 | 7/2020 | Meiri et al. |
| 2020/0226023 | A1 | 7/2020 | Meiri |
| 2020/0226145 | A1 | 7/2020 | Meiri |
| 2020/0233704 | A1 | 7/2020 | Alkalay et al. |
| 2020/0233705 | A1 | 7/2020 | Alkalay et al. |
| 2020/0233881 | A1 | 7/2020 | Harduf et al. |
| 2020/0242130 | A1 | 7/2020 | Chen et al. |
| 2020/0250144 | A1 | 8/2020 | Natanzon et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

ITZIKR, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

(56) References Cited

OTHER PUBLICATIONS

ITZIKR, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,708, filed in the name of Xianping Chen et al. Jul. 28, 2017 and entitled "Token-Based Data Flow Control in a Clustered Storage System."

U.S. Appl. No. 15/662,809, filed in the name of William Stronge et al. Jul. 28, 2017 and entitled "Automatic Verification of Asynchronously Replicated Data."

U.S. Appl. No. 15/662,833, filed in the name of William Stronge et al. Jul. 28, 2017 and entitled "Signature Generator for Use in Comparing Sets of Data in a Content Addressable Storage System."

U.S. Appl. No. 15/793,121, filed in the name of David Meiri et al. Oct. 25, 2017 and entitled "Opportunistic Compression of Replicated Data in a Content Addressable Storage System."

U.S. Appl. No. 15/793,147, filed in the name of Ernesto Blanco et al. Oct. 25, 2017 and entitled "Compression Signaling for Replication Process in a Content Addressable Storage System."

U.S. Appl. No. 15/872,553, filed in the name of Svetlana Kronrod et al. Jan. 16, 2018 and entitled "Storage System with Consistent Termination of Data Replication Across Multiple Distributed Processing Modules."

U.S. Appl. No. 15/824,536, filed in the name of Christopher Sayles et al. Nov. 28, 2017 and entitled "Storage System with Asynchronous Messaging Between Processing Modules for Data Replication."

U.S. Appl. No. 15/819,666, filed in the name of Xiangping Chen et al. Nov. 21, 2017 and entitled "Storage System Configured for Controlled Transition Between Asynchronous and Synchronous Replication Modes."

U.S. Appl. No. 15/876,433, filed in the name of Xiangping Chen et al. Jan. 22, 2018 and entitled "Storage System with Consistent Initiation of Data Replication Across Multiple Distributed Processing Modules."

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 16/343,942, filed in the name of Yonatan Shtarkman et al. Apr. 22, 2019, and entitled "Snapshot-Enabled Storage System Implementing Algorithm for Efficient Reclamation of Snapshot Storage Space."

U.S. Appl. No. 16/343,949, filed in the name of Asaf Porath et al. Apr. 22, 2019, and entitled "Snapshot-Enabled Storage System Implementing Algorithm for Efficient Reading of Data from Stored Snapshots."

U.S. Appl. No. 16/396,897, filed in the name of Anton Kucherov et al. Apr. 29, 2019, and entitled "Storage System with Deduplication-Aware Replication Implemented Using a Standard Storage Command Protocol."

U.S. Appl. No. 16/413,050, filed in the name of Xiangping Chen et al. May 15, 2019, and entitled "Storage System with Coordinated Recovery across Multiple Input-Output Journals of Different Types."

U.S. Appl. No. 16/530,121, filed in the name of Anton Kucherov et al. Aug. 2, 2019, and entitled "Memory-Efficient Processing of Raid Metadata Bitmaps."

U.S. Appl. No. 16/663,524, filed in the name of Xiangping Chen et al. Oct. 25 2019, and entitled "Storage System with Throughput-Based Timing of Synchronous Replication Recovery."

U.S. Appl. No. 16/665,651, filed in the name of Lior Kamran et al. Oct. 28 2019, and entitled "Recovery Flow with Reduced Address Lock Contention in a Content Addressable Storage System."

U.S. Appl. No. 16/671,824, filed in the name of Lior Kamran et al. Nov. 1, 2019, and entitled "Storage System Capacity Expansion Using Mixed-Capacity Storage Devices."

U.S. Appl. No. 16/693,858, filed in the name of Doron Tal Nov. 25, 2019, and entitled "Storage System with Prioritized RAID Rebuild."

\* cited by examiner

STORAGE SYSTEM WITH LOOPBACK REPLICATION PROCESS PROVIDING UNIQUE IDENTIFIERS FOR COLLISION-FREE OBJECT PAIRING

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, when testing the replication functionality of a given storage system, it may be necessary to provide an additional storage system to act as a source storage system or a target storage system relative to the storage system under test. This unduly increases the complexity and expense associated with replication testing.

SUMMARY

Illustrative embodiments include techniques for loopback replication providing unique identifiers for collision-free pairing of source and target storage objects in an information processing system. These embodiments allow the replication functionality of a given storage system to be accurately and efficiently tested in a loopback configuration and therefore without the need for any additional storage system to act as a source storage system or a target storage system relative to the storage system under test.

Such embodiments can advantageously eliminate those situations in which source and target storage object identifier collisions might otherwise arise when implementing loopback replication using replication techniques that are based on replication between separate and distinct source and target storage systems. The complexity and expense associated with replication testing can therefore be considerably reduced. Moreover, these and other advantages are provided in illustrative embodiments without undermining the efficiency of non-loopback replication functionality of the storage system.

These embodiments illustratively include a clustered implementation of a content addressable storage system having a distributed storage controller. Similar advantages can be provided in other types of storage systems.

In one embodiment, an apparatus comprises a storage system that includes a plurality of storage devices and a storage controller. The storage system is configured to implement a loopback replication process in which one or more source storage objects are replicated to one or more corresponding target storage objects within the storage system. The storage system is further configured to obtain a pairing identifier, to pair a source storage object with a target storage object by associating respective distinct instances of the pairing identifier with the source storage object and the target storage object, and to replicate the source storage object to the target storage object based at least in part on the associated instances of the pairing identifier.

Each of the instances of the pairing identifier comprises a collision field, with the collision field having a first value in the instance of the pairing identifier associated with one of the source storage object and the target storage object and a second value different than the first value in the instance of the pairing identifier associated with the other one of the source storage object and the target storage object.

The storage system further comprises at least one loopback communication link over which source data of the source storage object and other replication-related information is both transmitted and received by the storage system.

The source and target storage objects may comprise, for example, respective source and target logical volumes of the storage system, or other arrangements of source data to be replicated to target data.

The pairing identifier in some embodiments comprises a globally-unique identifier randomly generated within the storage system. Such a globally-unique identifier is illustratively modified to incorporate the collision field. For example, the collision field may comprise a single bit having a logic zero value in one of the instances of the pairing identifier and a logic one value in the other of the instances of the pairing identifier. A single-bit collision field of this type may comprise a final bit of the pairing identifier. The collision field is advantageously configured to ensure that collisions between pairing identifiers of source and target storage objects in the same storage system will not occur.

Each of the instances of the pairing identifier may further comprise a loopback field, with the loopback field having a first value to specify the corresponding pairing identifier as a loopback pairing identifier and a second value to specify the corresponding pairing identifier as a non-loopback pairing identifier. The loopback field may comprise a designated number of initial bytes of the pairing identifier. In some embodiments, the loopback field comprises a portion of the pairing identifier that is overwritten with one of the first value that specifies the pairing identifier as a loopback pairing identifier and the second value that specifies the pairing identifier as a non-loopback pairing identifier.

In conjunction with replication of the source storage object to the target storage object based at least in part on the associated instances of the pairing identifier, the storage system may be further configured to receive the instance of the pairing identifier associated with the source storage object, to modify the value of the collision field of the instance of the pairing identifier associated with the source storage object to obtain the instance of the pairing identifier associated with the target storage object, and to identify the target storage object utilizing its associated pairing identifier.

In an embodiment in which the collision field is implemented as a single-bit collision field of the type described previously, modifying the source pairing identifier instance to obtain the target pairing identifier instance illustratively comprises inverting the single bit of the collision field. A wide variety of alternative pairing identifier field configurations and associated processing operations may be used in other embodiments.

The storage system illustratively comprises a content addressable storage system having one or more sets of non-volatile memory storage devices. For example, the storage devices of the storage system in such embodiments can comprise flash memory storage devices configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
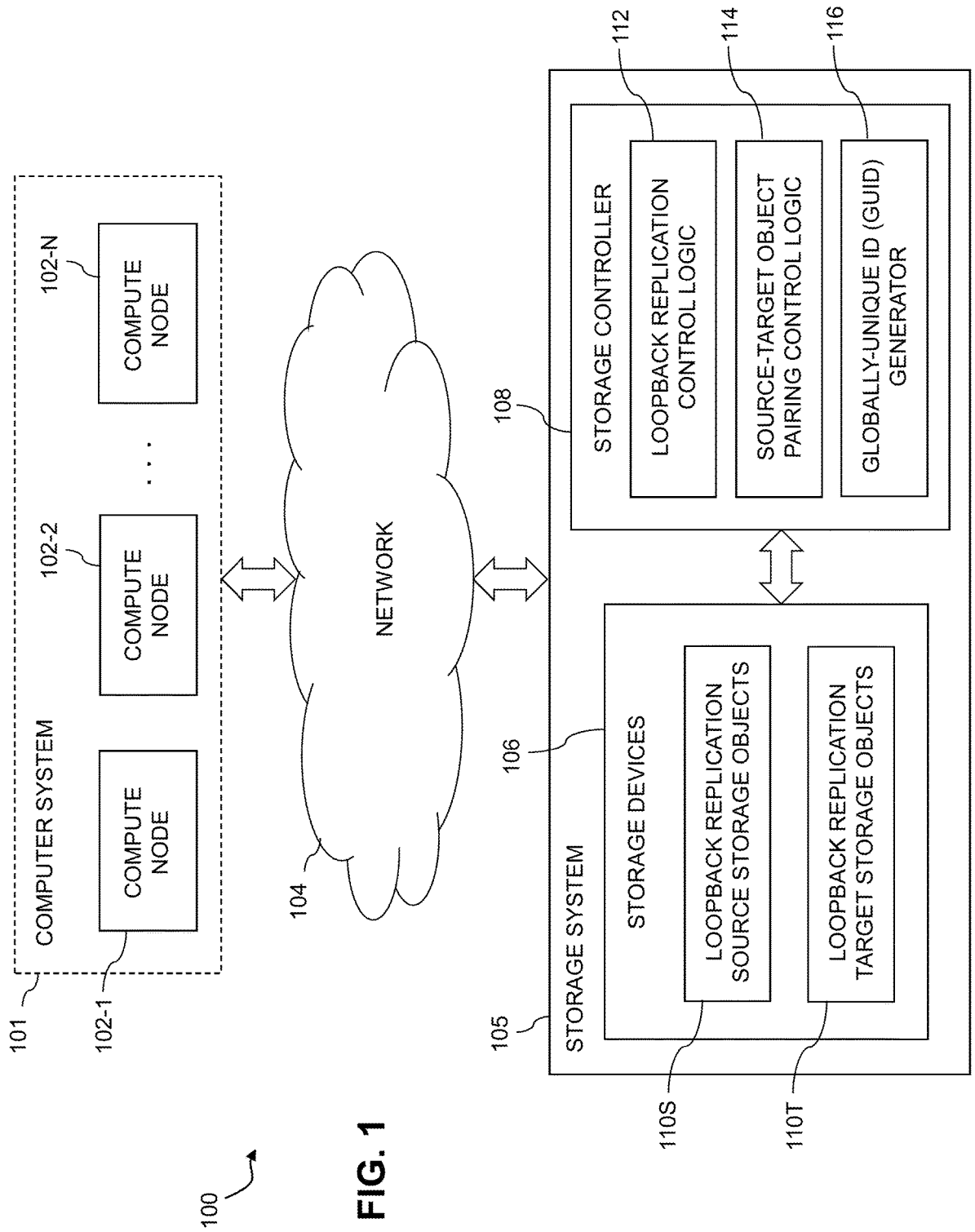
FIG. 1 is a block diagram of an information processing system comprising a storage system configured to implement a loopback replication process providing unique identifiers for collision-free pairing of source and target storage objects in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the storage system 105. The compute nodes 102 and the storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the compute nodes 102 of the computer system 101 over the network 104. The storage system 105 comprises a plurality of storage devices 106 and an associated storage controller 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 is configured to implement a loopback replication process in which one or more source storage objects are replicated to one or more corresponding target storage objects within the storage system. The loopback replication process can comprise one or more asynchronous or synchronous replication modes. For example, the loopback replication process can include a cycle-based asynchronous replication mode in which differential data derived from snapshots of the source storage object is utilized to update the target storage object in each of a plurality of replication cycles.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

As another example, the loopback replication process can include a synchronous replication mode in which host write operations directed to the source storage object are mirrored to the target storage object. A wide variety of other types of replication modes or processes can be used in other embodiments.

A given "replication process" as that term is broadly used herein may therefore include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

In addition, a replication process in some embodiments can comprise a process for migrating data from one location to another within the storage system 105. For example, a source storage object can be replicated to a target storage object in conjunction with migration of the corresponding data from one storage pool to another storage pool, from one RAID group to another RAID group, or otherwise from one location to another location within the storage system 105. A replication process as that term is broadly used herein is therefore intended to encompass such arrangements in which, for example, a source storage object is deleted from the storage system 105 after its successful migration to a target storage object.

Figure 4:
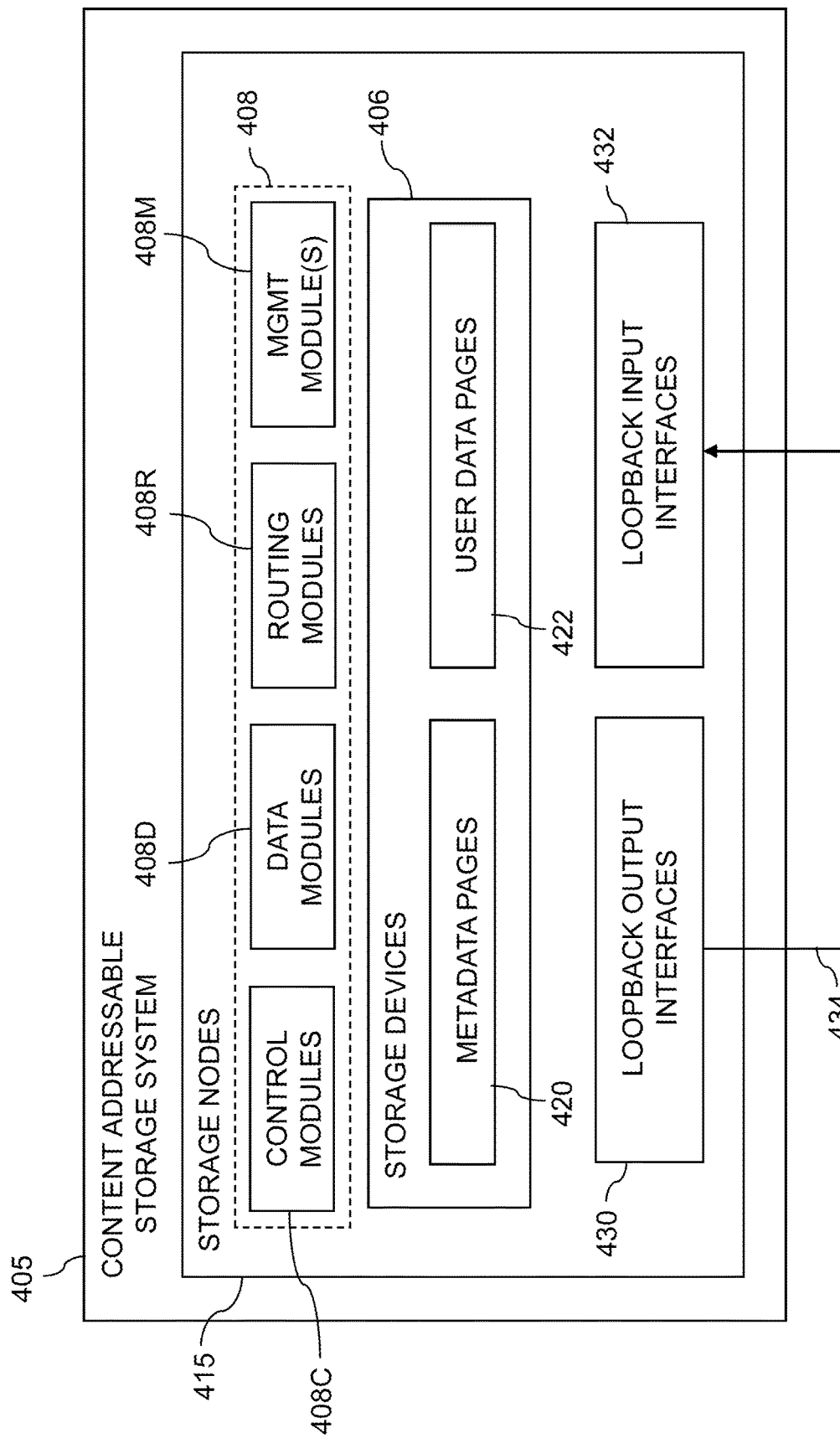
FIG. 4 shows an example of a content addressable storage system having a distributed storage controller for implementing loopback replication functionality in an illustrative embodiment.

The storage system 105 is assumed to comprise at least one loopback communication link over which source data of the one or more source storage objects and other replication-related information is both transmitted and received by the storage system 105, although such loopback communication links are not expressly shown in FIG. 1. The loopback communication links can comprise IP links or other types of network connections, as well as combinations of various links of different network connection types, that are utilized by the storage system 105 in conjunction with loopback replication. One possible example of a set of loopback communication links is shown in FIG. 4.

The storage devices 106 of storage system 105 comprise loopback replication source storage objects 110S and loopback replication target storage objects 110T. The source and target storage objects 110S and 110T may comprise, for example, respective source and target logical volumes of the storage system 105, or any other type of source and target data items that may be subject to loopback replication.

The storage controller 108 of the storage system 105 comprises loopback replication control logic 112, source-target object pairing control logic 114, and a globally-unique identifier (GUID) generator 116.

The loopback replication control logic 112 directs the overall loopback replication process implemented within the storage system 105, and interacts with the source-target object pairing control logic 114 and the GUID generator 116 in directing the storage system 105 to perform loopback replication process operations such as those to be described below in conjunction with the flow diagram of FIG. 2.

The GUID generator 116 in some embodiments randomly generates globally-unique identifiers or GUIDs that are utilized as pairing identifiers by the source-target object pairing control logic 114 to pair source storage objects with respective target storage objects for loopback replication purposes. The GUIDs are therefore examples of what are more generally referred to herein as "pairing identifiers."

In operation, the storage system 105 under the direction of the loopback replication control logic 112 of the storage controller 108 is configured to obtain a pairing identifier from the GUID generator 116, and to pair a source storage object with a target storage object by associating respective distinct instances of the pairing identifier with the source storage object and the target storage object utilizing the source-target object pairing control logic 114. The storage system 105 then replicates the source storage object to the target storage object based at least in part on the associated instances of the pairing identifier.

The GUID is globally unique within the storage system 105. Thus, the term "global" in this embodiment refers to the entire storage space of the storage system 105. The GUID is illustratively implemented as a 16-byte randomly-generated identifier that serves as a pairing identifier. Pairing of the source and target storage objects via a pairing identifier ensures that a replication engine or other implementation of the loopback replication control logic 112 of the storage controller 108 can easily determine the appropriate locations from which to read source data of the source storage object and at which to write the source data to the target storage object, thereby facilitating the replication process. However, use of the same pairing identifier for source and target storage objects in loopback replication absent modification of their respective instances of that pairing identifier as disclosed herein could otherwise lead to collisions between the source and target objects.

Illustrative embodiments avoid such collisions by modifying the GUID in a different manner for each of source and target instances of the GUID. The modified GUID that serves as a pairing identifier in these embodiments includes a collision field that has one value for the instance associated with the source storage object, and a different value for the instance associated with the target storage object.

As will be described in more detail below, each of the instances of the pairing identifier comprises a collision field, with the collision field having a first value in the instance of the pairing identifier associated with one of the source storage object and the target storage object, and a second value different than the first value in the instance of the pairing identifier associated with the other one of the source storage object and the target storage object.

The pairing identifier illustratively comprises a modified version of the GUID, with different modifications being used to distinguish between the source and target storage objects that are paired via that GUID. For example, the pairing identifier may comprise the GUID modified to incorporate the collision field, which as noted above has different values for the source storage object and the target storage object.

As a more particular example, the collision field in some embodiments comprises a single bit having a logic zero value in one of the two instances of the pairing identifier and a logic one value in the other of the two instances of the pairing identifier. More specifically, a logic zero value can be used in the instance of the pairing identifier associated with the source storage object and a logic one value can be used in the instance of the pairing identifier associated with the target storage object, or vice-versa. In some embodiments, a single-bit collision field of this type illustratively comprises a final bit of the pairing identifier, such as a most significant bit of the pairing identifier.

It is important to note that the collision field in illustrative embodiments is not tied to a particular replication direction, and so the replication direction can be reversed in a straightforward manner.

In addition, the pairing identifier is not tied to any specific set of replication session configuration parameters, and so could be used to support multiple replication sessions between source and target storage objects.

Each of the instances of the pairing identifier may also include a loopback field, which indicates that those instances of the pairing identifier are utilized in a loopback replication process. For example, the loopback field may have a first value to specify the pairing identifier as a loopback pairing identifier and a second value to specify the pairing identifier as a non-loopback pairing identifier. Both the source instance of the pairing identifier and the target instance of the pairing identifier will generally include the same value in their respective loopback fields, as both the source and target storage objects are paired with one another via their respective instances of the pairing identifier for participation in the loopback replication process implemented by storage system 105.

In some embodiments, the loopback field comprises a designated number of initial bytes of the pairing identifier, such as a particular number of least significant bytes of the pairing identifier.

As a more particular example, the loopback field may comprise a portion of the GUID that is overwritten with one of the first value that specifies the pairing identifier as a loopback pairing identifier and the second value that specifies the pairing identifier as a non-loopback pairing identifier.

Additional examples of source and target instances of the pairing identifier for pairing a given source storage object with a given target storage object will be presented below in the description of FIG. 3.

In conjunction with replication of the source storage object to the target storage object based at least in part on the associated instances of the pairing identifier, the storage system 105 is further configured to receive the instance of the pairing identifier associated with the source storage object, to modify the value of the collision field of the instance of the pairing identifier associated with the source storage object to obtain the instance of the pairing identifier associated with the target storage object, and to identify the target storage object utilizing its associated pairing identifier.

Such operations can be repeated in multiple iterations for respective different portions of the source data of the source storage object, until all source data of the source storage object has been replicated to the target storage object.

These and other operations carried out as part of the loopback replication process of storage system 105 are illustratively performed under the control of the loopback replication control logic 112 of the storage controller 108.

Although illustratively shown as being implemented within the storage system 105, the storage controller 108 in other embodiments can be implemented at least in part within the computer system 101, in another system component, or as a stand-alone component coupled to the network 104.

The computer system 101 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the storage system 105 may be implemented on respective distinct processing platforms, although numerous other arrangements are possible. For example, in some embodiments at least portions of the computer system 101 and the storage system 105 are implemented on the same processing platform. The storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different ones of the compute nodes 102 to reside in different data centers than the storage system 105. Numerous other distributed implementations of one or both of the computer system 101 and the storage system 105 are possible. Accordingly, the storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, storage system 105, storage devices 106 and storage controller 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 218, and is suitable for use in the system 100 but is more generally applicable to other types of information processing systems in which a storage system is configured to perform loopback replication. The steps are illustratively performed at least in part under the control of a loopback replication engine or other arrangement of loopback replication control logic in a storage controller of the storage system.

In step 200, a loopback replication process is initiated in order to replicate a source storage object to a target storage object within the storage system. As indicated previously, the loopback replication process is assumed to comprise at least one of a cycle-based asynchronous replication mode in which differential data derived from snapshots of the source storage object is utilized to update the target storage object in each of a plurality of replication cycles, and a synchronous replication mode in which host write operations directed to the source storage object are mirrored to the target storage object.

In some embodiments, the loopback replication process may start in one of the modes and transition to the other mode, and then back again. For example, the loopback replication process may start in an asynchronous replication mode and transition to a synchronous replication mode and vice-versa. Such replication modes may alternatively be implemented as respective separate replication processes.

In step 202, a pairing identifier is obtained. The pairing identifier illustratively comprises a GUID of the type previously described.

In step 204, the source and target storage objects are paired with one another by associating respective distinct instances of the obtained pairing identifier with the source and target storage objects.

Figure 3:
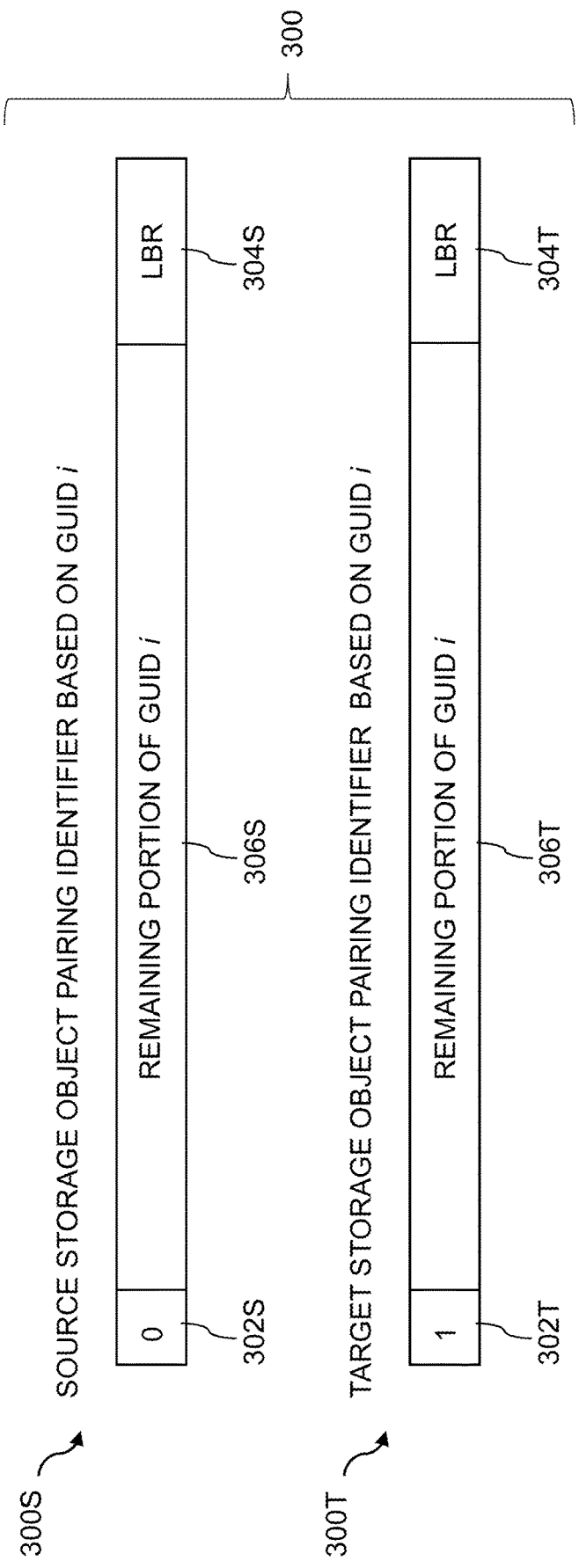
FIG. 3 shows an example of distinct instances of a pairing identifier associated with respective source and target storage objects in an illustrative embodiment.

An example of an arrangement of this type is illustrated in FIG. 3, which shows source and target instances 300S and 300T of a pairing identifier 300. The instances 300S and 300T of the pairing identifier 300 comprise respective collision fields 302S and 302T, respective loopback fields 304S and 304T, and remaining portions 306S and 306T of the particular GUID, illustratively denoted as GUID i in this embodiment.

The pairing identifier 300 illustratively comprises GUID i with portions thereof overwritten with the collision fields 302 and the loopback fields 304, leaving remaining portions 306 of GUID i as shown. The remaining portions 306 of GUID i are assumed to be sufficient to guarantee uniqueness within the storage system 105.

The collision fields 302 each comprise a single bit in the respective source and target instances 300S and 300T of the pairing identifier 300, with a logic zero value in one of the instances of the pairing identifier 300 and a logic one value in the other of the instances of the pairing identifier. More particularly, the collision fields 302S and 302T of the source and target instances 300S and 300T have respective distinct values of logic zero and logic one in this embodiment. The single-bit collision field comprises a final bit of the pairing identifier, illustratively a most significant bit of GUID i as illustrated. The source and target designations can be easily reversed by altering the single-bit collision fields of the source and target instances of the pairing identifier 300.

The loopback fields 304S and 304T each have the same value in this embodiment, namely, a unique binary identifier denoted LBR that specifies the pairing identifier 300 as a loopback pairing identifier utilized in a loopback replication process. A different identifier would be present in the loopback field of a non-loopback pairing identifier, to indicate that the pairing identifier is utilized in a non-loopback replication process, such as one carried out between the storage system 105 and a separate target storage system.

The loopback fields 304S and 304T each comprise a designated number of initial bytes of the pairing identifier 300, illustratively comprising multiple least significant bytes in this embodiment.

For example, the loopback field illustratively comprises the first three bytes or another designated number of initial bytes of the 16-byte GUID. The LBR identifier allows the loopback replication control logic to associate the pairing identifier 300 with a loopback replication process as opposed to a non-loopback replication process.

Like the collision fields 302, the loopback fields 304 comprise portions of the pairing identifier 300 that are overwritten with particular values, in this case the unique binary identifier LBR to indicate that the pairing identifier 300 and its respective source and target instances 300S and 300T are utilized to pair the corresponding source and target storage objects in a loopback replication process.

The particular pairing identifier format and fields shown in FIG. 3 are only an example, and numerous other formats using different arrangements and configurations of collision and loopback fields can be used. For example, different fixed bit positions can be used for the collision and loopback fields in other embodiments.

The remainder of the FIG. 2 process will now be described.

In step 206, in conjunction with the loopback replication of source data, an instance of the pairing identifier associated with the source storage object is obtained.

In step 208, the collision field of the source instance of the pairing identifier is inverted in order to obtain the target instance of the pairing identifier.

In step 210, the target storage object is identified using the target instance of the pairing identifier.

In step 212, data is replicated from the source storage object to the target storage object.

In step 214, a determination is made as to whether or not there is additional source data of the source storage object to be replicated from the source to the target. If there is additional source data still remaining to be replicated, the process moves to step 216, and otherwise the process ends as indicated in step 218.

In step 216, the replication of additional source data is directed, and the process returns to step 206 to repeat steps 206 through 212 to replicate that additional source data from the source storage object to the target storage object.

One or more additional iterations through steps 214, 216 and 206 through 212 may then be performed, until all of the source data of the source storage object has been replicated to the target storage object, at which point a negative determination in step 214 will cause the process to end in step 218.

Figure 2:
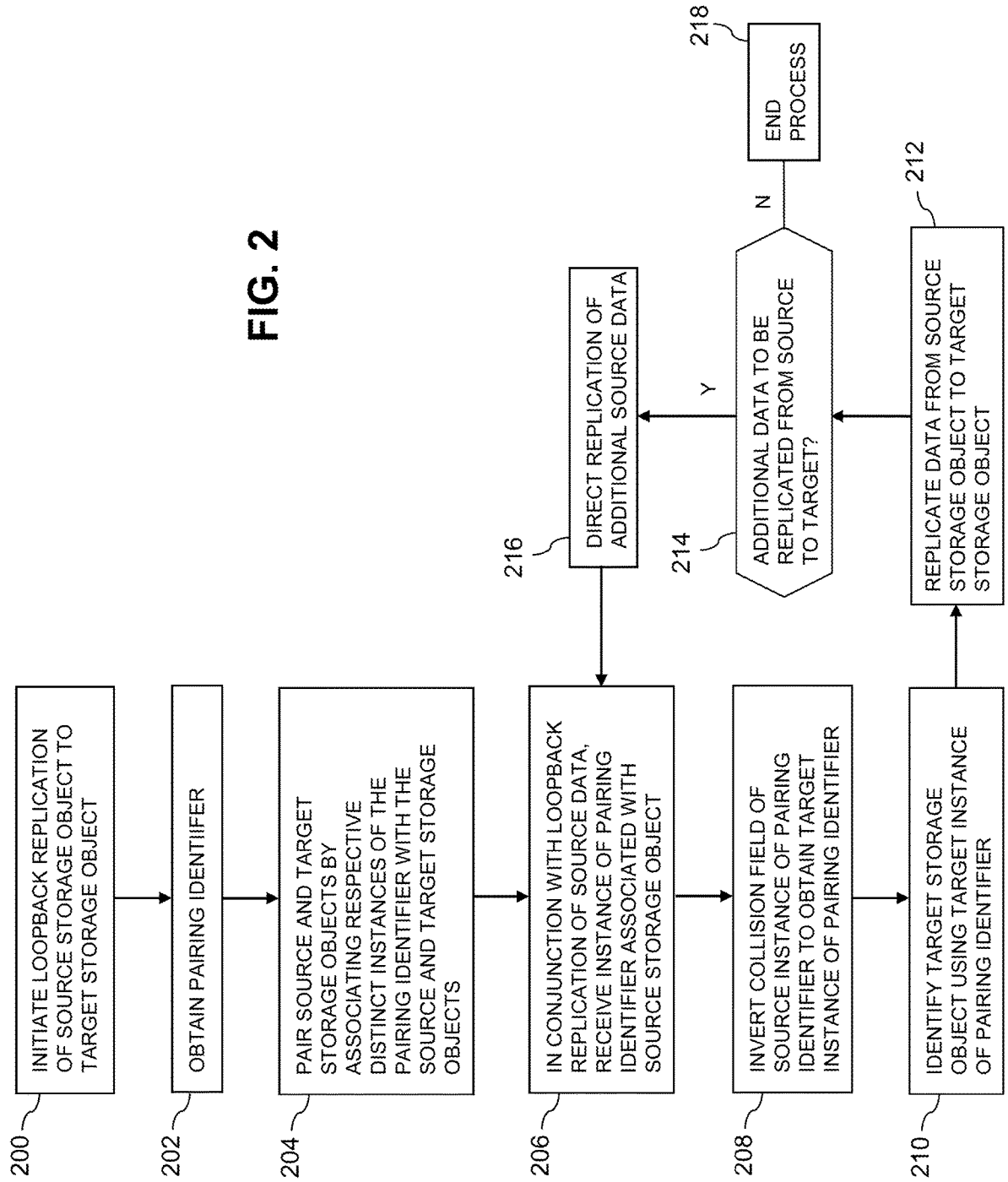
FIG. 2 is a flow diagram of a process for loopback replication providing unique identifiers for collision-free pairing of source and target storage objects in an illustrative embodiment.

In the FIG. 2 embodiment, the loopback replication process may transition from asynchronous replication to synchronous replication, and vice-versa. During at least a portion of such a transition, the storage system may concurrently operate in both asynchronous and synchronous replication modes, possibly using controlled transition functionality as disclosed in U.S. patent application Ser. No. 15/819,666, filed Nov. 21, 2017 and entitled "Storage System Configured for Controlled Transition Between Asynchronous and Synchronous Replication Modes," which is incorporated by reference herein.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing loopback replication providing unique identifiers for collision-free pairing of source and target storage objects. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different loopback replication processes for respective different sets of replicated data or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array or other type of content addressable storage system suitably modified to incorporate loopback replication techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of storage system 105, and accordingly is assumed to be coupled to computer system 101 having compute nodes 102 via network 104 within information processing system 100.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 422 can include any type of user data that may be utilized in the system 100. The term "user data" herein is therefore also intended to be broadly construed.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The distributed storage controller 408 in the present embodiment is configured to implement loopback replication functionality of the type previously described in conjunction with FIGS. 1 through 3.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Ownership of a user data logical address space within the content addressable storage system 405 is illustratively distributed among the control modules 408C.

It is desirable in these and other storage system contexts to implement loopback replication functionality across multiple distributed processing modules, such as the processing modules 408C, 408D, 408R and 408M of the distributed storage controller 408.

The management module 408M of the storage controller 408 may include a loopback replication engine or other arrangement of loopback replication control logic that engages corresponding control logic instances in all of the control modules 408C and routing modules 408R in order to implement a loopback replication process.

The loopback replication process in this embodiment utilizes loopback output interfaces 430 and loopback input interfaces 432 of the storage nodes 415. The loopback output interfaces 430 and loopback input interfaces 432 are coupled together via one or more communication links 434 which carry replication-related information from replication outputs of the content addressable storage system 405 to corresponding replication inputs of the content addressable storage system 405.

The interfaces 430 and 432 may be the same interfaces that would normally be used to interface the storage system 405 with a separate target storage system in a non-loopback replication process implemented by storage system 405.

In some embodiments, the content addressable storage system 405 comprises an XtremIO™ storage array suitably modified to incorporate techniques for loopback replication as disclosed herein. In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, loopback replication functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the compute nodes 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement loopback replication functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of content addressable storage systems or other types of storage systems with loopback replication functionality as disclosed herein can provide a number of significant advantages relative to conventional arrangements.

For example, some embodiments implement loopback replication utilizing unique identifiers for collision-free pairing of source and target storage objects within a given storage system.

These embodiments allow the replication functionality of a given storage system to be accurately and efficiently tested in a loopback configuration and therefore without the need for any additional storage system to act as a source storage system or a target storage system relative to the storage system under test.

Such embodiments can advantageously eliminate those situations in which source and target storage object identifier collisions might otherwise arise when implementing loopback replication using replication techniques that are based on replication between separate and distinct source and target storage systems. The complexity and expense associated with replication testing can therefore be considerably reduced.

Moreover, these and other advantages are provided in illustrative embodiments without undermining the efficiency of non-loopback replication functionality of the storage system.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105 and 405, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
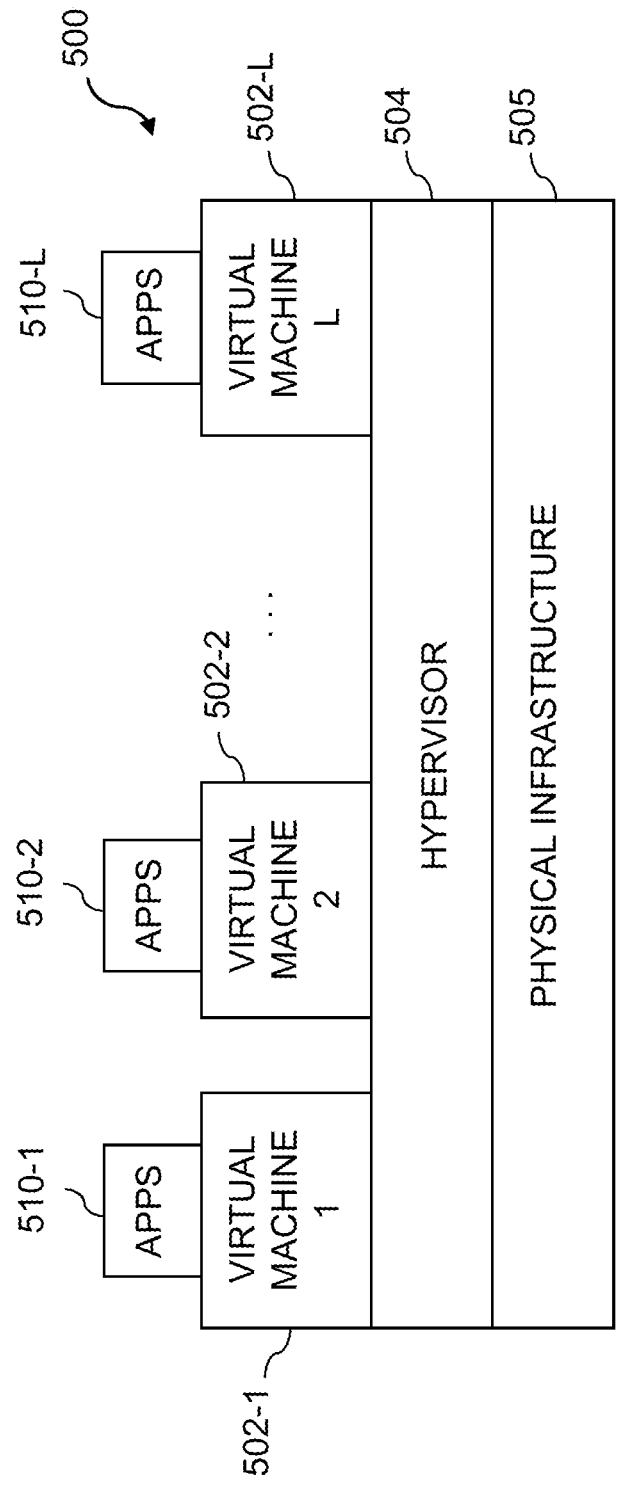
FIGS. 5 and 6 show examples of processing platforms that may be utilized to implement at least a portion of an information processing system in illustrative embodiments.
Figure 6:
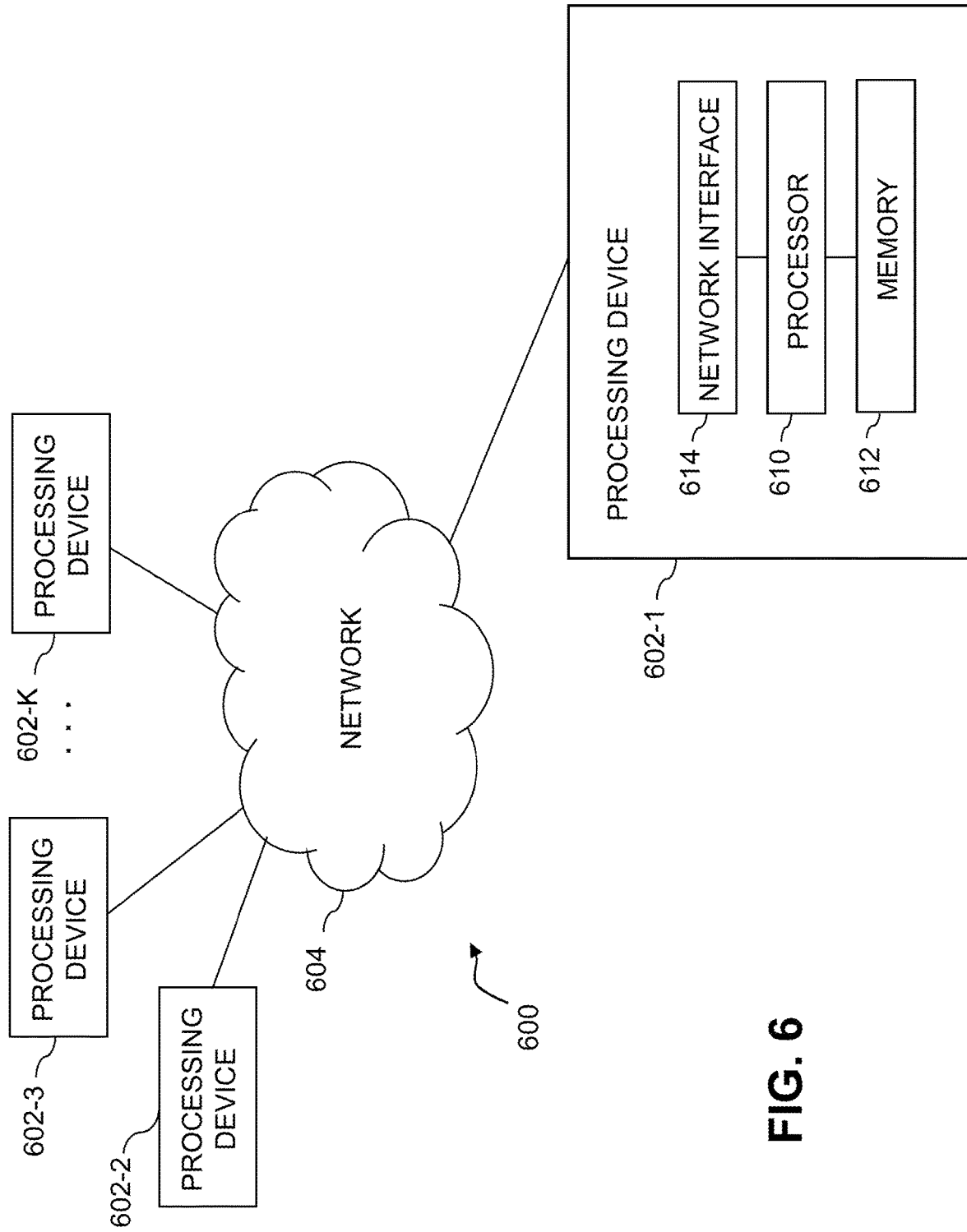

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108 and 408 of respective storage systems 105 and 405 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, replication processes, replication engines and associated replication control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage system being configured:
to obtain a pairing identifier, wherein the pairing identifier identifies a source storage object of the storage system to be replicated to a corresponding target storage object of the storage system as part of a loopback replication process;
to pair the source storage object of the storage system with the target storage object of the storage system by associating respective distinct instances of the pairing identifier with the source storage object and the target storage object; and
to replicate the source storage object to the target storage object in the loopback replication process based at least in part on the associated instances of the pairing identifier;
wherein each of the instances of the pairing identifier comprises a collision field, the collision field having a first value in the instance of the pairing identifier associated with one of the source storage object and the target storage object and a second value different than the first value in the instance of the pairing identifier associated with the other one of the source storage object and the target storage object;
wherein each of the instances of the pairing identifier further comprises a loopback field, the loopback field having a first value to specify the pairing identifier as a loopback pairing identifier and a second value to specify the pairing identifier as a non-loopback pairing identifier;
wherein the loopback field comprises a portion of the pairing identifier that is overwritten with one of the first value that specifies the pairing identifier as a loopback pairing identifier and the second value that specifies the pairing identifier as a non-loopback pairing identifier; and
wherein the storage system is implemented using at least one processing device comprising a processor coupled to a memory.

2. The apparatus of claim 1 wherein the loopback replication process comprises at least one of:
a cycle-based asynchronous replication mode in which differential data derived from snapshots of the source storage object is utilized to update the target storage object in each of a plurality of replication cycles; and
a synchronous replication mode in which host write operations directed to the source storage object are mirrored to the target storage object.

3. The apparatus of claim 1 wherein the storage system further comprises at least one loopback communication link over which replication-related information is both transmitted and received by the storage system.

4. The apparatus of claim 1 wherein the source and target storage objects comprise respective source and target logical volumes of the storage system.

5. The apparatus of claim 1 wherein the loopback field comprises a designated number of initial bytes of the pairing identifier.

6. The apparatus of claim 1 wherein the pairing identifier comprises a globally-unique identifier randomly generated within the storage system.

7. The apparatus of claim 6 wherein the globally-unique identifier is modified to incorporate the collision field.

8. The apparatus of claim 1 wherein the collision field comprises a single bit having a logic zero value in one of the instances of the pairing identifier and a logic one value in the other of the instances of the pairing identifier.

9. The apparatus of claim 8 wherein the single-bit collision field comprises a final bit of the pairing identifier.

10. The apparatus of claim 1 wherein in conjunction with replication of the source storage object to the target storage object based at least in part on the associated instances of the pairing identifier, the storage system is further configured:
to receive the instance of the pairing identifier associated with the source storage object;

to modify the value of the collision field of the instance of the pairing identifier associated with the source storage object to obtain the instance of the pairing identifier associated with the target storage object; and to identify the target storage object utilizing its associated pairing identifier.

11. The apparatus of claim 1 wherein the instance of the pairing identifier having the first value in its collision field comprises the instance associated with the source storage object.

12. The apparatus of claim 1 wherein the storage system comprises a content addressable storage system including a plurality of storage nodes each comprising one or more of the storage devices and wherein each of the storage nodes of the first storage system further comprises a set of processing modules configured to communicate over one or more networks with corresponding sets of processing modules on other ones of the storage nodes, the sets of processing modules of the storage nodes of the storage system collectively comprising at least a portion of the storage controller of the storage system, and further wherein each of the sets of processing modules of the storage system comprises one or more control modules, one or more routing modules and one or more data modules, and wherein at least one of the sets of processing modules comprises a management module.

13. A method comprising:
obtaining a pairing identifier in a storage system, wherein the pairing identifier identifies a source storage object of the storage system to be replicated to a corresponding target storage object of the storage system as part of a loopback replication process;
pairing the source storage object of the storage system with the target storage object of the storage system by associating respective distinct instances of the pairing identifier with the source storage object and the target storage object; and
performing loopback replication of the source storage object to the target storage object in the loopback replication process based at least in part on the associated instances of the pairing identifier;
wherein each of the instances of the pairing identifier comprises a collision field, the collision field having a first value in the instance of the pairing identifier associated with one of the source storage object and the target storage object and a second value different than the first value in the instance of the pairing identifier associated with the other one of the source storage object and the target storage object;
wherein each of the instances of the pairing identifier further comprises a loopback field, the loopback field having a first value to specify the pairing identifier as a loopback pairing identifier and a second value to specify the pairing identifier as a non-loopback pairing identifier;
wherein the loopback field comprises a portion of the pairing identifier that is overwritten with one of the first value that specifies the pairing identifier as a loopback pairing identifier and the second value that specifies the pairing identifier as a non-loopback pairing identifier; and
wherein the method is implemented by at least one processing device comprising a processor coupled to a memory.

14. The method of claim 13 wherein performing loopback replication of the source storage object to the target storage object based at least in part on the associated instances of the pairing identifier further comprises:
receiving the instance of the pairing identifier associated with the source storage object;
modifying the collision field of the instance of the pairing identifier associated with the source storage object to obtain the instance of the pairing identifier associated with the target storage object; and
identifying the target storage object utilizing its associated pairing identifier.

15. A computer program product comprising a non-transitory processor-readable storage medium having stored therein program code of one or more software programs, wherein the program code when executed by at least one processing device of a storage system causes the storage system:
to obtain a pairing identifier, wherein the pairing identifier identifies a source storage object of the storage system to be replicated to a corresponding target storage object of the storage system as part of a loopback replication process;
to pair the source storage object of the storage system with the target storage object of the storage system by associating respective distinct instances of the pairing identifier with the source storage object and the target storage object; and
to perform loopback replication of the source storage object to the target storage object in the loopback replication process based at least in part on the associated instances of the pairing identifier;
wherein each of the instances of the pairing identifier comprises a collision field, the collision field having a first value in the instance of the pairing identifier associated with one of the source storage object and the target storage object and a second value different than the first value in the instance of the pairing identifier associated with the other one of the source storage object and the target storage object;
wherein each of the instances of the pairing identifier further comprises a loopback field, the loopback field having a first value to specify the pairing identifier as a loopback pairing identifier and a second value to specify the pairing identifier as a non-loopback pairing identifier; and
wherein the loopback field comprises a portion of the pairing identifier that is overwritten with one of the first value that specifies the pairing identifier as a loopback pairing identifier and the second value that specifies the pairing identifier as a non-loopback pairing identifier.

16. The computer program product of claim 15 wherein performing loopback replication of the source storage object to the target storage object based at least in part on the associated instances of the pairing identifier further comprises:
receiving the instance of the pairing identifier associated with the source storage object;
modifying the collision field of the instance of the pairing identifier associated with the source storage object to obtain the instance of the pairing identifier associated with the target storage object; and
identifying the target storage object utilizing its associated pairing identifier.

17. The computer program product of claim 15 wherein the pairing identifier comprises a globally-unique identifier randomly generated within the storage system.

18. The computer program product of claim 17 wherein the globally-unique identifier is modified to incorporate the collision field.

19. The computer program product of claim 15 wherein the collision field comprises a single bit having a logic zero value in one of the instances of the pairing identifier and a logic one value in the other of the instances of the pairing identifier.

20. The computer program product of claim 19 wherein the single-bit collision field comprises a final bit of the pairing identifier.

\* \* \* \* \*